United States Patent
Nicol, II et al.

(10) Patent No.: US 9,454,737 B2
(45) Date of Patent: Sep. 27, 2016

(54) SOLUTION THAT LEVERAGES AN INSTANT MESSAGING SYSTEM TO MANAGE AD HOC BUSINESS PROCESS WORKFLOWS

(75) Inventors: William B. Nicol, II, Durham, NC (US); Andrew B. Smith, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1994 days.

(21) Appl. No.: 12/201,793

(22) Filed: Aug. 29, 2008

(65) Prior Publication Data

US 2010/0057862 A1 Mar. 4, 2010

(51) Int. Cl.
G06F 15/16 (2006.01)
G06F 3/048 (2013.01)
G06K 9/00 (2006.01)
G06Q 10/06 (2012.01)
G06Q 10/10 (2012.01)
H04L 12/18 (2006.01)
G06N 3/02 (2006.01)

(52) U.S. Cl.
CPC ............ G06Q 10/06 (2013.01); G06Q 10/10 (2013.01); *G06N 3/02* (2013.01); *H04L 12/1813* (2013.01)

(58) Field of Classification Search
CPC ..... G06N 3/02; H04L 12/1813; G06Q 50/01
USPC ...................... 705/1; 709/203, 206
See application file for complete search history.

(56) References Cited

U.S. PATENT DOCUMENTS

| | | | |
|---|---|---|---|
| 5,448,739 A * | 9/1995 | Jacobson | 719/320 |
| 6,185,700 B1 * | 2/2001 | Niwa et al. | 714/37 |
| 6,324,551 B1 | 11/2001 | Lamping et al. | |
| 7,191,233 B2 * | 3/2007 | Miller | 709/227 |
| 7,409,671 B1 * | 8/2008 | Meredith et al. | 717/104 |
| 7,496,518 B1 * | 2/2009 | Cayton et al. | 705/321 |
| 7,664,806 B1 * | 2/2010 | Koudas et al. | 707/899 |
| 7,684,821 B2 * | 3/2010 | Mousseau et al. | 455/550.1 |
| 7,890,084 B1 * | 2/2011 | Dudziak et al. | 455/411 |
| 2003/0055977 A1 * | 3/2003 | Miller | 709/227 |
| 2003/0225847 A1 * | 12/2003 | Heikes et al. | 709/207 |
| 2004/0088448 A1 * | 5/2004 | Joshi et al. | 710/15 |
| 2004/0103149 A1 * | 5/2004 | Tanigawa et al. | 709/204 |
| 2004/0229199 A1 * | 11/2004 | Ashley et al. | 434/323 |
| 2005/0015437 A1 * | 1/2005 | Strait | 709/203 |
| 2005/0027585 A1 * | 2/2005 | Wodtke et al. | 705/9 |
| 2005/0125246 A1 * | 6/2005 | Muller et al. | 705/1 |
| 2005/0132056 A1 * | 6/2005 | Creamer et al. | 709/227 |
| 2005/0138132 A1 * | 6/2005 | Zhou et al. | 709/207 |
| 2005/0188016 A1 * | 8/2005 | Vdaygiri et al. | 709/205 |
| 2005/0203757 A1 * | 9/2005 | Lei et al. | 705/1 |
| 2005/0216635 A1 * | 9/2005 | Nishimura | 710/260 |
| 2005/0246686 A1 * | 11/2005 | Seshadri | G06N 5/046 717/117 |
| 2006/0004690 A1 * | 1/2006 | Beartusk et al. | 707/1 |

(Continued)

Primary Examiner — Arvin Eskandarnia
Assistant Examiner — Margishi Desai
(74) Attorney, Agent, or Firm — Patents on Demand P.A.; Brian K. Buchheit; Scott M. Garrett

(57) ABSTRACT

A process definition entered into a user interface that is coupled with an instant messaging client application can be identified. The process definition can represent an ad hoc business process. The process definition can utilize entities defined in a contact of the instant messaging (IM) client application. The process definition can execute. Upon reaching a terminating condition defined within the process definition, results of executing the process definition can be presented via the user interface.

20 Claims, 4 Drawing Sheets

(56) References Cited

U.S. PATENT DOCUMENTS

| | | | |
|---|---|---|---|
| 2006/0085245 A1* | 4/2006 | Takatsuka et al. | 705/9 |
| 2006/0124722 A1* | 6/2006 | Williams | G06Q 10/10 235/375 |
| 2006/0167993 A1* | 7/2006 | Aaron et al. | 709/204 |
| 2006/0256816 A1* | 11/2006 | Yarlagadda et al. | 370/466 |
| 2006/0288107 A1* | 12/2006 | Klassen et al. | 709/227 |
| 2007/0094338 A1* | 4/2007 | Kirkham | 709/206 |
| 2007/0208587 A1* | 9/2007 | Sitaraman | 705/1 |
| 2007/0220091 A1* | 9/2007 | Wang et al. | 709/204 |
| 2007/0294079 A1* | 12/2007 | Ishikura et al. | 704/3 |
| 2008/0040428 A1* | 2/2008 | Wei et al. | 709/204 |
| 2008/0068447 A1* | 3/2008 | Mattila et al. | 348/14.08 |
| 2009/0013275 A1* | 1/2009 | May et al. | 715/765 |
| 2009/0064104 A1* | 3/2009 | Baeyens et al. | 717/114 |
| 2009/0069915 A1* | 3/2009 | Khedouri et al. | 700/94 |
| 2009/0187831 A1* | 7/2009 | Tiwana et al. | 715/752 |
| 2009/0282104 A1* | 11/2009 | O'Sullivan et al. | 709/204 |
| 2009/0299802 A1* | 12/2009 | Brennan | 705/8 |
| 2012/0246249 A1* | 9/2012 | Keen et al. | 709/206 |

* cited by examiner

Sample Process Definition 300

```
<ProcessDefinition>
  <MessageText>
        <line1>Please review my travel request.</line1>
        <line2>Respond with approve, deny, or pass.</line2>
  </MessageText>
  <ProcessFlowControl>
      <gate>
          <value>Approve</value>
          <terminate> false </terminate>
      </gate>
      <gate>
          <value>Deny</value>
          <terminate> true </terminate>
      </gate>
      <gate>
          <value>Pass</value>
          <terminate> false </terminate>
      </gate>
  </ProcessFlowControl>
  <ParticipantSequence>
      <ProcessParticipant>
          <id> 1stLineMgr </id>
          <comment/>
          <gatedResponse>
              <timestamp>06/06/07 11:52:2007 </timestamp>
              <value> approved </value>
          </gatedResponse>
      </ProcessParticipant>
      <ProcessParticipant>
          <id> 2ndLineMgr </id>
          <comment/>
          <gatedResponse/>
      </ProcessParticipant>
  </ParticipantSequence>
  <DataItems>
      <item>
          <type>url</type>
          <location>www.travelform.com/myform</location>
      </item>
  </DataItems>
</ProcessDefinition>
```

- 305: MessageText block
- 310: ProcessFlowControl block
- 315: first gate
- 320: value Approve
- 325: </gate>
- 330: ParticipantSequence
- 335: first ProcessParticipant
- 340: <ProcessParticipant>
- 345: <id>
- 350: <gatedResponse>
- 355: timestamp
- 360: </gatedResponse>
- 365: DataItems
- 370: item
- 375: item start
- 380: location

FIG. 3

SOLUTION THAT LEVERAGES AN INSTANT MESSAGING SYSTEM TO MANAGE AD HOC BUSINESS PROCESS WORKFLOWS

BACKGROUND

The present invention relates to the field of instant messaging and, more particularly, to utilizing an instant messaging system to handle ad hoc business process workflows.

Businesses utilize a variety of software applications and systems to manage the performance of daily tasks. Process management applications and/or systems electronically automate business processes, such as the approval of travel requests, increasing employee productivity and efficiency. However, the implementations of such process management applications/systems often result in a rigidity that hinders the quick incorporation of new or ad hoc processes.

For example, an employee must often follow a formal request process to have a new process added to the process management application/system. The formal request process often requires more time than the requester can wait. Even in situations where processes are added liberally, processes that are only needed once or infrequently consume space within the application/system, degrading performance.

Conventional process management applications/systems typically require an entry for all of the entities defined in the workflow of the business process. That is, all of the employees and/or departments that are required to participate in the business process must be defined within the process management application/system. This often creates problems communicating the tasks of the business process with entities that are outside of the main organization.

SUMMARY

One aspect of the present invention can include a method for utilizing an instant messaging system to manage the execution of simple ad hoc business processes. Such a method can begin with the creation of a process definition by a process originator using a user interface that can be coupled with an instant messaging client application. The process definition can represent a simple ad hoc business process and can utilize entities defined in a contact list of the instant messaging client application. Then, the process definition can be executed. Upon reaching a terminating condition of the process definition, the results of the execution of the process definition can be reported to the process originator.

Another aspect of the present invention can include a system that utilizes an instant messaging system to manage the execution of simple ad hoc business processes. Such a system can include an instant messaging system, a process definition, and a process handler. The instant messaging system can be configured to convey instant messages between multiple instant messaging client applications. The process definition can represent a simple ad hoc business process that requires communication between multiple entities, who can be members of the instant messaging system. The process handler can be configured to interface with the instant messaging system to send and receive instant messages in accordance with the process definition to execute the simple ad hoc business process.

Yet another aspect of the present invention can include a computer program product that utilizes an instant messaging system to manage the execution of simple ad hoc business processes. Such a computer program product can include a computer usable medium containing computer usable program. The computer usable program code can be configured to create a process definition. The process definition can represent a simple ad hoc business process and utilize entities defined in a contact list of an instant messaging client application. Additionally, the computer usable program code can be configured to execute the process definition. The computer usable program code can also be configured to report results to a process originator upon reaching a terminating condition defined within the process definition

BRIEF DESCRIPTION OF THE SEVERAL VIEWS OF THE DRAWINGS

FIG. 3 is an illustration of a sample process definition in accordance with an embodiment of the inventive arrangements disclosed herein.

DETAILED DESCRIPTION

Figure 1:
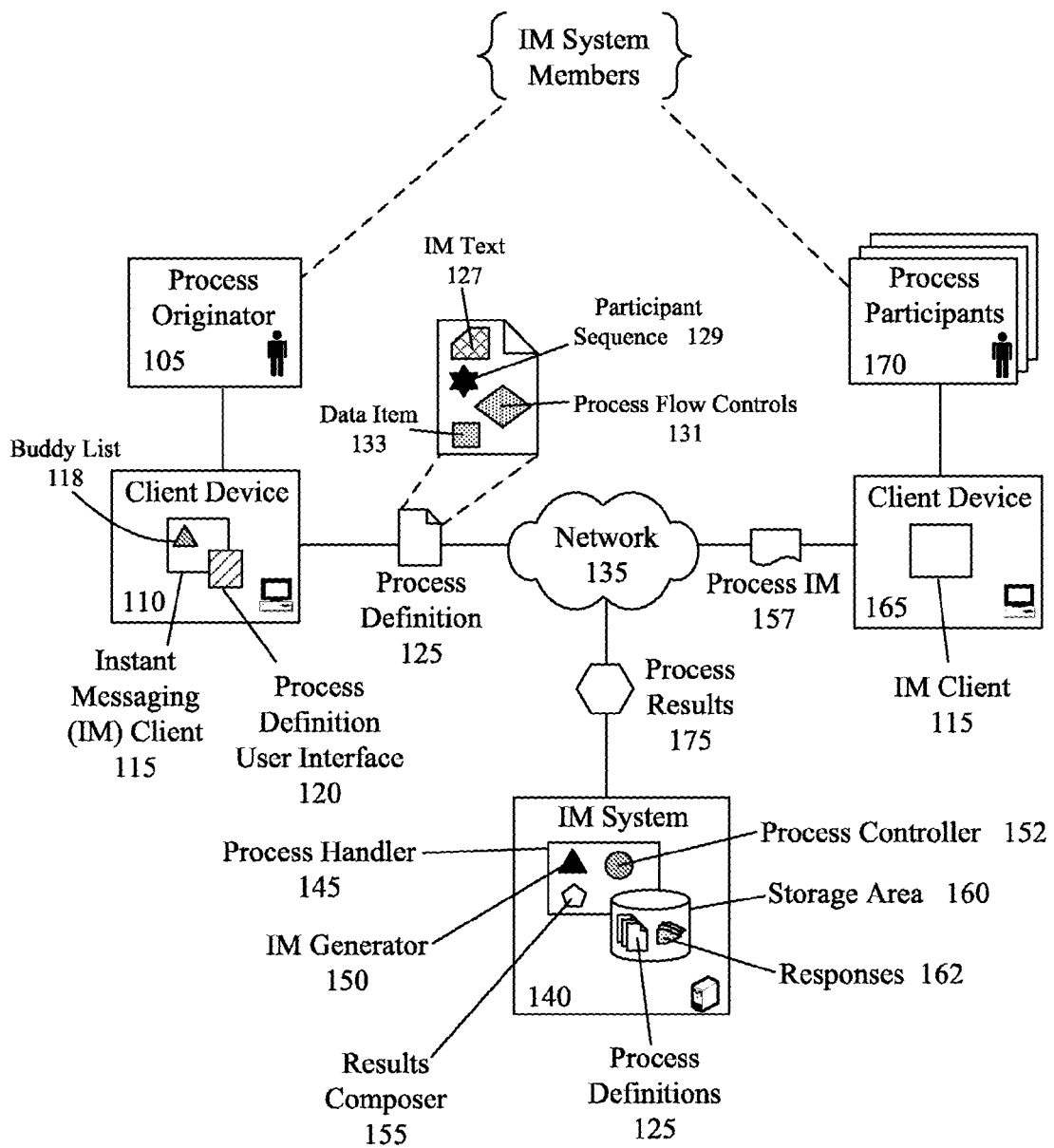
FIG. 1 is a schematic diagram illustrating a system for utilizing an instant messaging (IM) system to manage simple ad hoc business processes in accordance with embodiments of the inventive arrangements disclosed herein.

The present invention discloses a solution that leverages the functionality of an instant messaging (IM) system to manage simple user-created ad hoc business processes. A process handler can allow a user to create a process definition detailing the contents of IMs to send, the IM system users to which the IMs are to be sent, and how to handle the response IMs from the IM users. Once the process definition is created, the process handler can automatically send the defined IMs to the specified IM system users in a specified order. Responses to the sent IMs can be evaluated against defined process flow controls to determine how execution of the process definition should continue. Upon receipt of a terminating condition, the process handler can return the results of executing the process definition to the process originator.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, FIG. 1 is a schematic diagram illustrating a system 100 for utilizing an instant messaging (IM) system 140 to manage the execution of simple ad hoc business processes in accordance with embodiments of the inventive arrangements disclosed herein. As used herein, the term "simple ad hoc business process" is defined as a business process whose decision points require uncomplicated responses, such as "yes/no" or "pass/fail", which can be programmatically evaluated by the process handler 145.

In system 100, a process handler 145 component of an IM system 140 can send/receive IMs 157 to/from the process participants 170 to execute the simple ad hoc business process defined within the process definition 125 by the process originator 105. The process originator 105 can create the process definition 125 using the process definition user interface 120 from a client device 110.

The client device 110 can be any of a variety of computing devices capable of running the IM client 115 and process definition user interface 120, and communicating with the IM system 140 over the network 135. Examples of the client device 110 can include, but, are not limited to, a personal computer, a desktop computer, a laptop computer, a mobile phone, a portable multimedia device, a personal data assistant (PDA), and the like.

The process definition user interface 120 can be a software component that interacts with the IM client 115 to create the process definition 125. As shown in this example, the process definition user interface 120 can be a coupled component of the IM client 115.

In an alternate embodiment, the process definition user interface 120 can exist as a separate software application capable of communicating with the IM client 115. In such an embodiment, the process definition user interface 120 can operate from either the client device 110 or a component, such as a server, of the IM system 140.

The process definition 125 can represent a simple ad hoc business process, such as approving a travel request. The process definition 125 can be written in a standardized language, such as an extensible markup language (XML) that can be utilized by the process handler 145. Elements defined by the process originator 105 within the process definition 125 can include an IM text 127, a participant sequence 129, process flow controls 131, and a data item 133.

The IM text 127 can represent the textual message that can be sent to a participant 170 of the process in an instant message 157. In the IM text 127, the process originator 105 can express the purpose of the IM 157 as well as the proper responses expected from the process participants 170.

The participant sequence 129 can contain an ordered list of process participants 170. The ordering of process participants 170 can represent the sequence in which process IMs 157 are delivered. The process participants 170 of the participant sequence 129 can be selected from a contact list 118 of the IM client 115.

The process definition user interface 120 can be configured to interact with the IM client 115 in order to allow the selection of contact list 118 members within the process definition user interface 120. The interaction between the IM client 115 and the process definition user interface 120 can be transparent to the process originator 105 when selecting contact list 118 members. That is, the process originator 105 can execute commands within the IM client 115 that can trigger the execution of other commands by the process definition user interface 120.

For example, the process originator 105 can select a menu command within the IM client 115 to add a selected contact list 118 member to the participant sequence 129. This command, though executed within the IM client 115, can trigger the process definition user interface 120 to create the appropriate entry within the participant sequence 129 for the selected participant 170.

It should be emphasized that the selection of the process participants 170 from the contact list 118 of the IM client 115 only requires that the participants 170 are members of the IM system 140. Conventional process management systems typically require that all of the process participants 170 to be members of the system, and, as such, members of the same organization. The members of contact lists 118 can belong to various organizations with the common communicative link of the IM system 140.

The process flow controls 131 can define the conditions for continuing and terminating the execution of the process definition 125. The conditions of the process flow controls 131 can be based on the expected responses from the process participants 170. For example, a response of "YES" from a participant 170 can represent a continuation condition, whereas a response of "NO" can be a terminating condition of the process definition 125.

The process originator 105 can also associate one or more data items 133 with the process definition 125. A data item 133 can correspond to additional information related to the simple ad hoc business process. For example, the process originator 105 can include an electronic document representation of the travel request form with the process definition 125.

Once the process definition 125 is defined, the process originator 105 can select a command that initiates the execution of the process definition 125. Initiation of the process definition 125 can include the transmission of the process definition 125 to the process handler 145 over the network 135.

The process handler 145 can represent a software application that can interface with the IM system 140 to execute the process definition 125. As shown in this example, the process handler 145 can operate from within the IM system 140. In another embodiment, the process handler 145 can be located on a separate computing device (not shown) that is capable of communicating with the IM system 140 over the network 135.

To perform the necessary functionality, the process handler 145 can utilize the elements of the process definition 125 in conjunction with an IM generator 150, a process controller 152, a results composer 155, and a storage area 160. The storage area 160 can represent a physical and/or virtual memory space available to the process handler 145. The storage area 160 can store the process definition 125 received by the process handler 145 from the process originator 105 as well as the responses 162 received from the process participants 170.

The IM generator 150 can represent the component of the process handler 145 that can be configured to create the IMs 157 to send to the designated process participants 170 identified in the participant sequence 129 from the IM text 127 and data elements 133 of the process definition 125.

The process participants 170 can receive the process IMs 157 using an IM client 115 running on a client device 165 over the network 135.

The process controller 152 can correspond to the component of the process handler 145 configured to determine the execution of the process definition 125. The contents of the responses 162 can be evaluated by the process controller 152 against the process flow controls 131 contained within the process definition 125. The result of this evaluation can determine the continuation or termination of the process definition 125.

When a terminating condition of the process definition 125 is met, the results composer 155 can generate and convey the process results 175 back to the process originator 105. The process results 175 can represent the predefined information captured by the process handler 145 and compiled by the results composer 155. Examples of information contained within the process results 175 can include, but are not limited to, the text of the received responses 162, the timestamp of the received responses 162, the processing result of the received responses 162, and the like.

The process results 175 can be written in a standardized language that can be viewed by the process originator 105. Presentation of the process results 175 can be performed by the process definition user interface 120, IM client 115, or another standard software application capable of presenting the process results 175.

Figure 2:
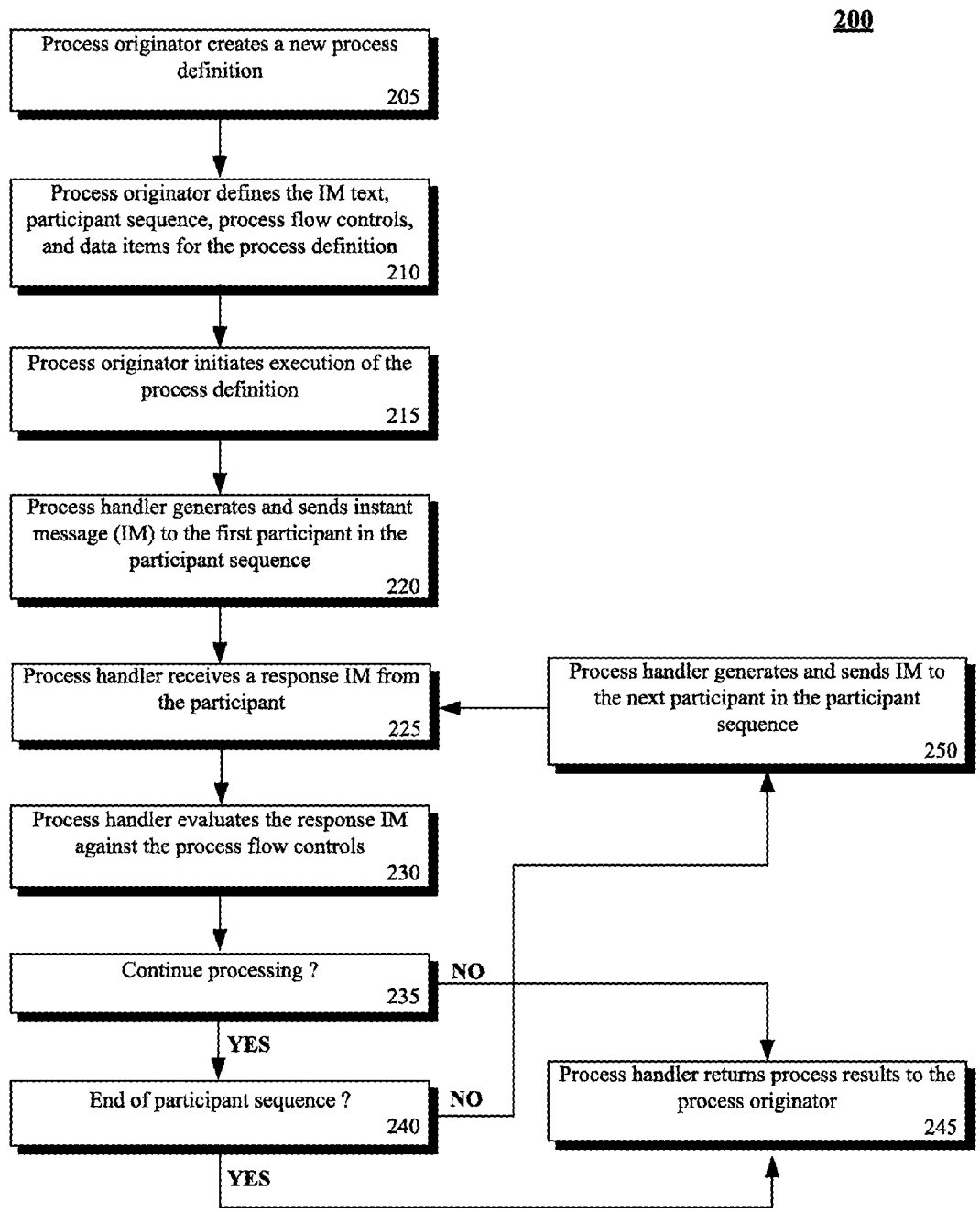
FIG. 2 is a flow chart of a method for leveraging an instant messaging (IM) system to manage the execution of simple ad hoc business processes in accordance with an embodiment of the inventive arrangements disclosed herein.

FIG. 2 is a flow chart of a method 200 for leveraging an instant messaging (IM) system to manage the execution of simple ad hoc business processes in accordance with an embodiment of the inventive arrangements disclosed herein. Method 200 can be performed in the context of system 100 or any other system configured to utilize an IM system to manage execution of simple ad hoc business processes.

Method 200 can begin with step 205 where a process originator can create a new process definition. In step 210, the process originator can define the process definition elements—IM text, participant sequence, process flow controls, and associated data items. Execution of the process definition can be initiated by the process originator in step 215.

In step 220, the process handler can generate and send an instant message (IM) to the first participant in the participant sequence. The process handler can receive a response IM from the participant in step 225. In step 230, the response IM can be evaluated against the process flow controls by the process handler.

When the evaluation of the response IM indicates that processing of the process definition should continue, step 240 can execute where it can be determined if the end of the participant sequence has been reached. Upon successful completion of the participant sequence or when the evaluation of the response IM indicates process termination, flow can proceed to step 245 where the process handler can return the process results to the process originator.

When it is determined that processing is to continue and the end of the participant sequence has not been reached, the process handler can generate and send the IM to the next participant in the participant sequence in step 250. From step 250, flow can return to step 225 where the steps of method 200 can reiterate until processing is complete, indicated by reaching the end of the participant sequence, or a terminating condition is returned by a participant.

FIG. 3 is an illustration of a sample process definition 300 in accordance with an embodiment of the inventive arrangements disclosed herein. The sample process definition 300 can be utilized by system 100 and/or method 200.

It should be noted that the representation of the sample process definition 300 is for illustrative purposes only, and, that other formats and implementations can utilize varying syntactical and semantic representations.

In this example, the sample process definition 300 is presented using an extensible markup language (XML) format. As such, the sample process definition 300 can consist of various specialized tags, attributes, and data values.

The sample process definition 300 can include tags that define the message text 305 for the IMs sent to the participants, the process flow controls 310 for evaluating participant responses, the participant sequence 330, and associated data items 365. The tags defining the message text 305 can capture the text that the process originator wants to have in the IMs sent to the process participants.

The process flow control tags 310 can express the logic for evaluating participant responses in respect to terminating or continuing the execution of the process definition 300. As shown in this example, each process flow control 310 can be represented by a set of gate tags 315. Each gate 315 can include tags defining the value 320 of the corresponding received or expected response and whether the response value 320 is a terminating condition 325.

In this example, the sample process definition 300 contains three sets of gate tags 315. A response of "Deny" is defined as a terminating condition 325, whereas responses of "Approve" and "Pass" indicate the continued execution of the sample process definition 300.

The participant sequence tags 330 can contain information identifying the members of the IM system that the process originator selected from their contact list to participate in the business process represented by the sample process definition 300. Each member selected for the participant sequence 330 can be represented by a set of process participant tags 335.

Each set of process participant tags 335 can include tags for identifying the participant 340, capturing comments 345 from the participant, and information about the response 350 from the participant. The information captured about the participant's response 350 can include the timestamp 355 for when the response was received by the IM system and the value 360 returned in the response. This information can be later returned to the process originator, such as in the process results 175 of system 100.

The data item tags 365 can contain information that allows the participants to access the designated data item. A set of item tags 370 can represent each data item that a process originator wishes to provide the participants of the sample process definition 300.

The tags used to define an item 370 can include a type tag 375 and a location tag 380. The type tag 375 can indicate a general category of the data item 370, such as a word processing document, or spreadsheet file, or a universal resource locator (URL). The location tag 380 can contain the network path or URL required to access the actual file.

Figure 4:
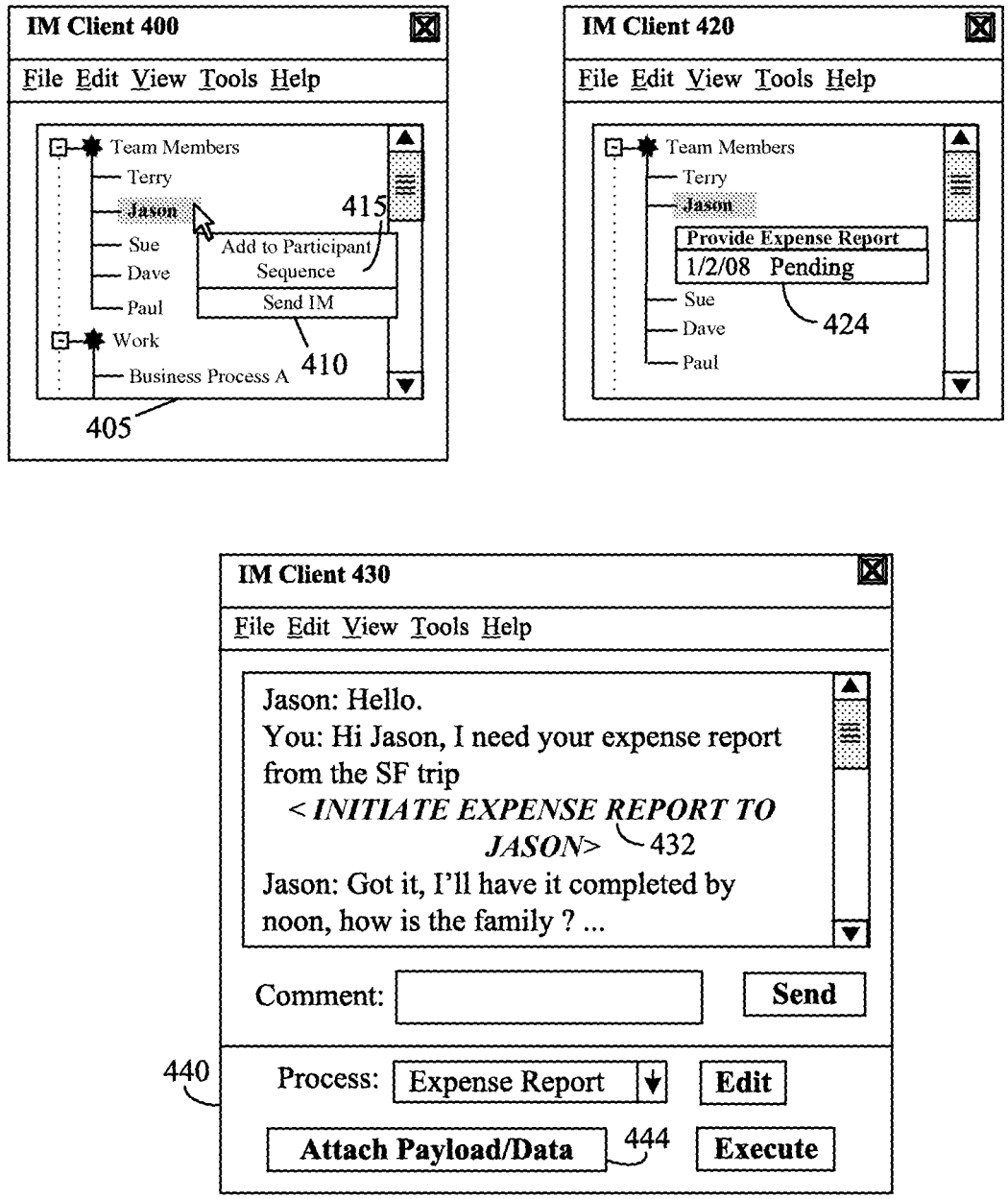
FIG. 4 is an example illustrating the selection of process participants using an instant messaging (IM) client 400 in accordance with an embodiment of the inventive arrangements disclosed herein.

FIG. 4 is an example illustrating the selection of process participants using an instant messaging (IM) client 400 in accordance with an embodiment of the inventive arrangements disclosed herein. The IM client 400 can be used by the process originator during the creation of the process definition.

When the IM client 400 presents the members of the contact list 405, the process originator can select a member and select a command 415 for adding the selected member to the participant sequence of the process definition. This selection of contact list 405 members can be implemented in a variety of ways. As shown in this example, a context menu 410 can be accessed by right-clicking on a selected member.

In an alternate embodiment, the process originator can perform the participant selection commands 415 graphically within the IM client 400. For example, the process originator can select multiple members of the contact list 405 and assign each a sequence number that can be translated into the participant sequence of the process definition.

In one embodiment, an IM contact list can be extended to show a status of one or more ad hoc business processes assigned to different members, such as through messages 424 presented proximate to each member, as shown by interface 420.

Various assignment techniques can be implemented to initiate an ad hoc business process via an IM client. As shown in interface 430, a separate section 440 of an IM interaction pane can permit new processes 422 to be initiated. An optional payload 444 or data set can be attached to a process 422 initiated via section 440. An IM discussion indication 432 can indicate that a new process has been conveyed to one or more IM communicator. In another embodiment, process specific commands can be entered textually within a standard comment field. For example, a user could enter a command "BP: expense report to Jason<fileABC." The BP can be an indicator to initiate a business process instead of sending a standard IM message. The next portion of the message can initiate the expense report. Finally, the last portion of the command can attach a fileABC to the expense report process. Interface 400, 420, 430 arrangements and examples presented in FIG. 4 are not intended to be comprehensive or to limit the invention in any manner, but are instead presented as an example to illustrate concepts disclosed herein.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for utilizing an instant messaging system to manage the execution of ad hoc business processes comprising:
   identifying a user-created process definition entered into a user interface of an instant messaging client application by a user, wherein said process definition represents an ad hoc business process, and, wherein the process definition utilizes entities defined in a contact of the instant messaging (IM) client application;
   creating the process definition by defining process flow controls for directing execution of the process definition based upon responses to the IMs received from the participants, wherein the process flow controls comprise at least a process continuation and a process termination;
   during an instant messaging communication session and responsive to an invocation action invoked from the user interface of the instant messaging client application, executing the process definition; and
   upon reaching a terminating condition defined within the process definition, presenting results of executing the process definition via the user interface, wherein the process definition created by the user interface is written in a standardized computing language.

2. The method of claim 1, wherein creating the process definition further comprises:
   assigning entities from the contact list to a participant sequence for the process definition, wherein the participant sequence represents an ordered list of participants in the ad hoc business process; and
   specifying message text for instant messages (IMs) to the participants of the participant sequence.

3. The method of claim 2, further comprising: associating a data item with the process definition, wherein said data item conveys additional self-contained information related to the ad hoc business process.

4. The method of claim 2, wherein the associated data item comprises at least one of an electronic file and a Universal Resource Locator (URL).

5. The method of claim 1, wherein executing the process definition further comprises:
   generating an IM, wherein contents of the IM are comprised of at least one element defined within the process definition;
   conveying the IM to a participant of the ad hoc business process, wherein the participant is a member of a participant sequence, wherein the participant sequence is an element of the process definition;
   receiving a response to the IM from the participant; and
   evaluating the received response against at least one process flow control of the process definition.

6. The method of claim 5, wherein the generating the IM, conveying the IM, receiving the response, and evaluating the received response are performed for a plurality of participants contained within the participant sequence.

7. The method of claim 5, wherein the contents of the instant message comprise at least two of a message text, an electronic document attachment, and a URL.

8. The method of claim 1, wherein the process definition comprises an IM text from the instant messaging client application to be delivered to participants, wherein the process definition comprises a participant sequence that represents a sequence in which process instant messages are delivered to participants receiving the IM text, and wherein the process definition comprise process flow controls that define conditions for continuing and terminating execution of the process definition, wherein the defined conditions are based on expected responses from the participants.

9. A system that utilizes an instant messaging system to manage the execution of ad hoc business processes comprising:
   an instant messaging system, comprising hardware and software, configured to convey instant messages (IMs) between a plurality of instant messaging client applications, said instant messaging system comprising:
      a process handler configured to interface with the IM system to:
         receive a process definition in a IM client user interface from a user;
         create the process definition by defining process flow controls for directing execution of the process definition based upon responses to the IMs received from participants, wherein the process flow controls comprise at least a process continuation and a process termination; and
         send and receive IMs in accordance with the process definition to execute the ad hoc business process, wherein said ad hoc business process is able to be invoked for the instant messaging user during an instant messaging session utilizing one of the plurality of instant messaging client applications; and
      a storage medium storing a plurality of process definitions, each of the process definitions representing an ad hoc business process that requires communication between a plurality of entities, wherein said plurality of entities are members of the instant messaging (IM) system;
   wherein the process definition is written in a standardized computing language that is interpretable by the process handler.

10. The system of claim 9, wherein the process definition further comprises:
    a participant sequence representing a plurality of participants of the ad hoc business process, wherein said plurality of participants are listed in a user-specified order, wherein said user-specified order outlines a sequential delivery of the IMs, and, wherein said plurality of participants correspond to entities of the IM system contained within a contact list of a process originator.

11. The system of claim 10, further comprising: an associated data element representing additional self-contained information related to the ad hoc business process, wherein the associated data element comprises at least one of an electronic document and a URL.

12. The system of claim 9, wherein the process handler further comprises:
    an instant message generator configured to create the IMs conveyed to the plurality of entities; and a process controller configured to evaluate an instant message response from an entity against process control logic contained within the process definition, wherein said evaluation determines a flow of the process definition.

13. The system of claim 12, further comprising: a process definition user interface configured to enable creation of the process definition, wherein said process definition user interface is coupled with an instant messaging client application of the instant messaging system.

14. The system of claim 9, wherein the process definition comprise process flow controls that define conditions for continuing and terminating execution of the process definition, wherein the defined conditions are based on expected responses from the participants.

15. A computer program product that utilizes an instant messaging system to manage the execution of ad hoc business processes comprising:
a non-transitory computer usable storage medium having computer usable program code embodied therewith, the computer usable program code comprising:
computer usable program code stored in the non-transitory storage medium configured to identify a user-created process definition entered into a user interface of an instant messaging client application by a user, wherein said process definition represents an ad hoc business process, and, wherein the process definition utilizes entities defined in a contact of the instant messaging (IM) client application;
computer usable program code stored in the non-transitory storage medium configured to create the process definition by defining process flow controls for directing execution of the process definition based upon responses to the IMs received from the participants, wherein the process flow controls comprise at least a process continuation and a process termination;
computer usable program code stored in the non-transitory storage medium configured to, during an instant messaging communication session and responsive to an invocation action invoked from the user interface of the instant messaging client application, execute the process definition; and
computer usable program code stored in the non-transitory storage medium configured to upon reaching a terminating condition defined within the process definition, present results of executing the process definition via the user interface, wherein the process definition comprise process flow controls that define conditions for continuing and terminating execution of the process definition, wherein the defined conditions are based on expected responses from the participants.

16. The computer program product of claim 15, wherein creating the process definition further comprises:
computer usable program code stored in the non-transitory storage medium configured to assign entities from the contact list to a participant sequence for the process definition, wherein the participant sequence represents an ordered list of participants in the ad hoc business process; and
computer usable program code stored in the non-transitory storage medium configured to specify message text for instant messages (IMs) to the participants of the participant sequence.

17. The computer program product of claim 16, further comprising: computer usable program code stored in the non-transitory storage medium configured to associate a data item with the process definition, wherein said data item conveys additional self-contained information related to the ad hoc business process.

18. The computer program product of claim 16, wherein the associated data item comprises at least one of an electronic file and a Universal Resource Locator (URL).

19. The computer program product of claim 15, wherein the computer usable program code configured to execute the process definition further comprises:
computer usable program code stored in the non-transitory storage medium configured to generate an IM, wherein contents of the IM are comprised of at least one element defined within the process definition;
computer usable program code stored in the non-transitory storage medium configured to convey the IM to a participant of the ad hoc business process, wherein the participant is a member of a participant sequence, wherein the participant sequence is an element of the process definition;
computer usable program code stored in the non-transitory storage medium configured to receive a response to the IM from the participant; and
computer usable program code stored in the non-transitory storage medium configured to evaluate the received response against at least one process flow control of the process definition.

20. The computer program product of claim 19, wherein the computer usable program code configured to generate the IM, the computer usable program code configured to convey the IM, the computer usable program code configured to receive the response, and the computer usable program code configured to evaluate the received response of are performed for a plurality of participants contained within the participant sequence.

* * * * *